(12) United States Patent  
Spencer et al.

(10) Patent No.: US 7,874,130 B2  
(45) Date of Patent: Jan. 25, 2011

(54) ICE CREAM SANDWICH-MAKING MACHINE

(75) Inventors: Jack D. Spencer, Westerville, OH (US); G. Scott Spears, Westerville, OH (US); Eric R. Rousculp, Worthington, OH (US)

(73) Assignee: Darifill Inc., Westerville, OH (US)

( * ) Notice: Subject to any disclaimer, the term of this patent is extended or adjusted under 35 U.S.C. 154(b) by 140 days.

(21) Appl. No.: 12/073,515

(22) Filed: Mar. 6, 2008

(65) Prior Publication Data

US 2008/0250754 A1    Oct. 16, 2008

Related U.S. Application Data

(60) Provisional application No. 60/905,073, filed on Mar. 6, 2007.

(51) Int. Cl.
 *B65B 11/06* (2006.01)

(52) U.S. Cl. ............... 53/461; 53/209; 53/223; 53/252

(58) Field of Classification Search ............ 53/209, 53/223, 224, 228, 230, 231, 232, 252, 461, 53/464, 465, 466, 387.2
See application file for complete search history.

(56) References Cited

U.S. PATENT DOCUMENTS

| 2,639,677 | A |  | 5/1953 | Anderson |
| 2,794,404 | A |  | 6/1957 | Rapp |
| 2,875,708 | A |  | 3/1959 | Hensgen |
| 2,993,453 | A |  | 7/1961 | Fay |
| 3,119,353 | A |  | 1/1964 | Roehn, Jr. |
| 3,316,860 | A |  | 5/1967 | Peterson |
| 3,783,772 | A |  | 1/1974 | Fay |
| 3,828,660 | A |  | 8/1974 | Mueller et al. |
| 3,834,119 | A |  | 9/1974 | Armitt et al. |
| 3,855,758 | A | * | 12/1974 | Walter et al. ............... 53/226 |
| 4,078,362 | A |  | 3/1978 | Ellis |
| 4,098,057 | A |  | 7/1978 | Holcomb |
| 4,448,012 | A |  | 5/1984 | Kauffman et al. |
| 4,584,933 | A |  | 4/1986 | Price |
| 4,612,852 | A |  | 9/1986 | Price et al. |
| 4,628,664 | A |  | 12/1986 | Price |
| 4,846,388 | A | * | 7/1989 | Benbow ..................... 226/134 |
| 5,493,957 | A |  | 2/1996 | Kennedy et al. |
| 2002/0000488 | A1 | * | 1/2002 | Shepard et al. ........... 242/588.1 |

\* cited by examiner

*Primary Examiner*—Hemant M Desai  
(74) *Attorney, Agent, or Firm*—Vorys, Sater, Seymour & Pease LLP; William H. Oldach III (57) ABSTRACT

An improved wrapping apparatus for an ice-cream sandwich-making machine comprises an oscillating arm and cam which drives a horizontal slider plate connected to a frame, and a pusher unit connected to an air cylinder; an improved paper feeder system, including separate paper and knife drives, air compression springs, and a paper low sensor; and a hinged exit tray.

4 Claims, 9 Drawing Sheets

ICE CREAM SANDWICH-MAKING MACHINE

RELATED APPLICATION

This application is a non-provisional application based upon Provisional Application Ser. No. 60/905,073, filed Mar. 6, 2007, priority to which is hereby claimed and which is incorporated herein by reference.

BACKGROUND OF THE INVENTION

There have been many machines known in the prior art for the manufacture and wrapping of ice cream sandwiches, the basic features of which are well understood by those of ordinary skill in the art. Examples of such prior art devices include those disclosed in U.S. Pat. No. 3,828,660 to Mueller et al., U.S. Pat. No. 3,834,119 to Armitt et al., and U.S. Pat. No. 5,493,957 to Kennedy et al., which are incorporated herein by reference.

As shown in these patents and as is well known in the prior art, an ice-cream sandwich filling machine typically comprises a machine frame to which a series of stations are affixed. The moving components of the machine are typically controlled by a numerical or computer controller through one or more drive mechanisms. The first station is typically the wafer filling station, in which a top and bottom wafer are provided by wafer feeders and an ice-cream extruder discharges ice cream between the wafers. The completed sandwich is then delivered, often via an indexing wheel or similar device, to a conveyor, also affixed to the machine frame, which carries the sandwich toward a wrapping area.

When the sandwich arrives at the wrapping area, it first enters at the bottom of a vertical elevator, where a cut sheet of wrap paper, provided by primary and secondary paper rollers and cut by a rotary knife between the two rollers, is situated atop the sandwich. The paper rollers are typically biased downward through the use of mechanical compression springs to provide friction between the roller and the supplied paper and thus to prevent slippage. The operation of the paper rollers and rotary knife and the arrangement of the cut sheet atop the sandwich is known in the prior art, and typically all of these parts have been commonly driven. The elevator then carries the sandwich and cut sheet upwards through the wrapping assembly, where a pusher mechanism cooperates with side and bottom tucking devices both to fold the paper about the sandwich and to push the wrapped sandwich toward an exit tray. The operation of these tuckers is also known in the prior art. The exit tray in turn includes one or more heated platens, which act to heat seal the bottom overlaps of the cut sheet of wrapping paper to each other, providing a secure wrap.

Despite the periodic improvements reflected in the above-referenced patents, there remain several drawbacks inherent in prior art ice cream sandwich-making machines, particularly with respect to the wrapping of the finished ice-cream sandwich product. For example, in prior art machines, the wrapping station requires either a mechanism to hold the wrapped sandwich during the return stroke of the pusher, or the use of two separate cams to drive separate vertical and horizontal plates. This requires adjustments to the machine and can lead to damage to sandwiches where the hold-back mechanism is employed. In addition, the supply and cutting of the paper to wrap the sandwich in prior art machines suffers from several drawbacks, including the need for improved control of the supply roll through primary and secondary rollers, the need for a sensor to detect when the supply roll is nearly empty, and the need to be able to "park" the paper web to avoid damage to the paper when the machine is stopped. Finally, the exit trays commonly used in prior art machines are usually unbolted from the machine frame in order to gain access below the tray for cleaning operations. This operation is thus time-consuming, resulting in lost filling time. Also, unbolting and removing the exit tray exposes workers to potential harm should the tray, which usually weighs over forty pounds, be dropped. These drawbacks have been solved through the present invention, described more fully as follows.

SUMMARY OF THE INVENTION

In one aspect of the present invention, an improved ice cream sandwich-making machine includes an improved pusher apparatus to deliver sandwiches from the wrapper head onto a heated platen while completing both bottom folds of the sandwich wrapping paper. The pusher apparatus comprises a horizontal plate and a vertical plate mounted to an oscillating arm driven by a cam. The vertical plate is attached rigidly to the oscillating arm, and the horizontal plate is spring loaded by an air cylinder so that it may move independently of the vertical plate.

In another aspect of the present invention, the primary and secondary paper rollers are driven separately from the main drive and from the rotary knife to improve performance.

In another aspect of the present invention, air cylinder springs are used rather than mechanical compression springs to bias the rollers to provide greater stability and adjustability to the pressure to be applied to the paper rollers.

In another aspect of the present invention, a sensor mechanism is provided situated inside the machine frame to detect when the paper supply is running low.

In another aspect of the present invention, a method of operation of the paper rollers is provided whereby the primary roller is reversed slightly after a sheet of paper is cut, thus avoiding damage to the paper web.

In yet another aspect of the present invention, a hinged exit tray provides easier access to the mechanism below the tray for cleaning, while avoiding down time and possible injury.

DETAILED DESCRIPTION OF PREFERRED EMBODIMENTS

Improved Pusher Apparatus

Figure 1:
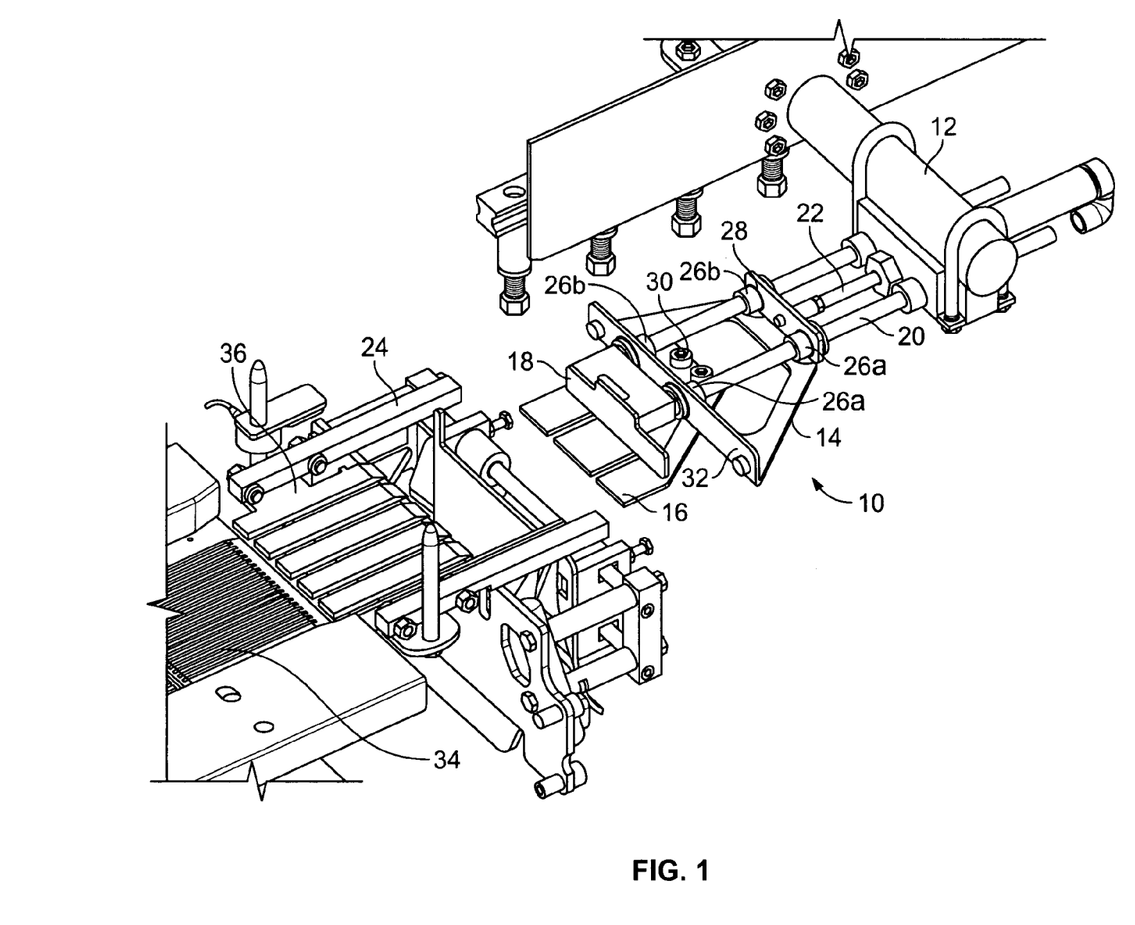
FIGS. 1 and 2 show an improved pusher apparatus in accordance with one aspect of the present invention.
Figure 2:
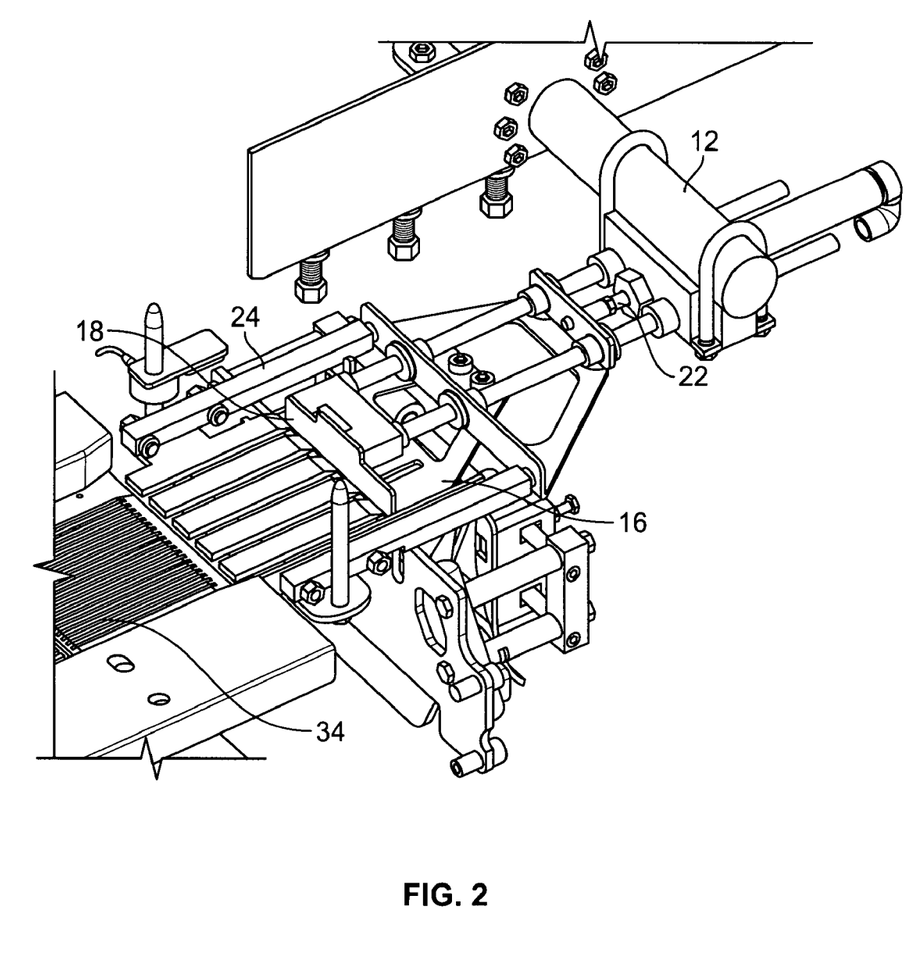

The operation of the improved pusher apparatus 10 may be seen with reference to FIGS. 1 and 2. The pusher is in constant back and forth motion between a "home" position shown in FIG. 1, and an "extended" position shown in FIG. 2. The pusher is driven by a cam and oscillating arm arrangement 12, the operation of which would be well understood by one of ordinary skill in the art. Frame 14 is connected to oscillating arm 12 through one or more rod members 20, and an air cylinder 22, at rear panel 28. Horizontal slider plate 16 is affixed to frame 14, for example by one or more screw-nut assemblies 30.

Pusher unit 18 is connected to arm 12 by the rods 20, which pass through apertures in rear panel 28 and forward panel 32 via outer bushings 26a and inner bushings 26b, but pusher 18 is not operationally connected to air cylinder 22. Thus pusher unit 18 can move independent of frame 14 and horizontal slider plate 16 as discussed below.

The improved pusher apparatus operates as follows. As a sandwich is delivered upward through the wrapping head by the elevator, arm 12 operates to move the pusher apparatus 10 to the left as shown in FIGS. 1 and 2. As the apparatus moves toward the left, horizontal slider plate 16 moves beneath the sandwich. This holds the sandwich in place as the elevator descends and creates the first bottom tuck fold of the paper in a manner known in the prior art. As the apparatus continues to the left, pusher unit 18 contacts the back of the sandwich. This moves the sandwich toward staging area 36.

As the leading edge of horizontal plate 16 meets the vertical back wall of the wrapping head, forward panel 32 contacts stationary stop 24, compressing air cylinder 22 and preventing further leftward movement of horizontal plate 16. Pusher unit 18, however, continues to the left, moving the sandwich off the horizontal plate 16 and delivering the wrapped sandwich to staging area 36 located before the heated platen 34. This movement eliminates the need for a hold-back mechanism as is used in prior art machines. Pusher unit 18 then starts to retract toward the home position pursuant to the operation of the cam and oscillating arm 12. During the retraction operation, horizontal plate 16 is extended by the air cylinder 22 as it moves away from the stationary stop 24.

In a basic embodiment of this aspect of the invention, rods 20 are comprised of a stainless steel composition and bushings 26a and 26b are comprised of plastic, and the apertures in panels 28 and 32 are circular to closely fit bushings 26a and 26b. However, in operation it has been discovered that it is often difficult to set rods 20 in a perfectly parallel arrangement, and that occasionally the rods themselves may not be perfectly straight. This can lead to degradation of the performance of the rods and bushings during operation. It has therefore been discovered, in a more preferred embodiment of this aspect, that one or more of the bushings 26a and 26b may be comprised of bronze, and that one or more of the apertures in panels 28 and 32 may be slotted rather than circular to allow for rod misalignment. Although it is not believed to be critical which bushing is bronze or which aperture is slotted, in practice, the inner bushings 26b have been made of bronze and the apertures surrounding the outer bushings 26a have been slotted.

Coupled and Air-Compressed Wrapping Paper Feed Rollers

Another aspect of the present invention involves mechanically coupling the primary and secondary wrapping paper feed rollers with a speed-up ratio. Sandwich machines require the over-wrap paper to be cut from a supply roll into sheets for the purpose of wrapping the sandwiches. Two nip rollers and a rotating knife blade perform this function. As shown representatively in FIG. 3, as is commonly known in the prior art, the first (primary) roller 110 meters the paper 118 from the supply roll 112 and positions the paper 118 for cutting. The second (secondary) roller 114 is designed to pull tension on the paper 118, while the rotary knife 116, located between the rollers 110 and 114, cuts the paper 118, resulting in a cut sheet 120. The secondary roller is also used to accelerate the cut sheet 120 away from the knife 116 and out into the wrapping section of the filling machine.

Figure 3:
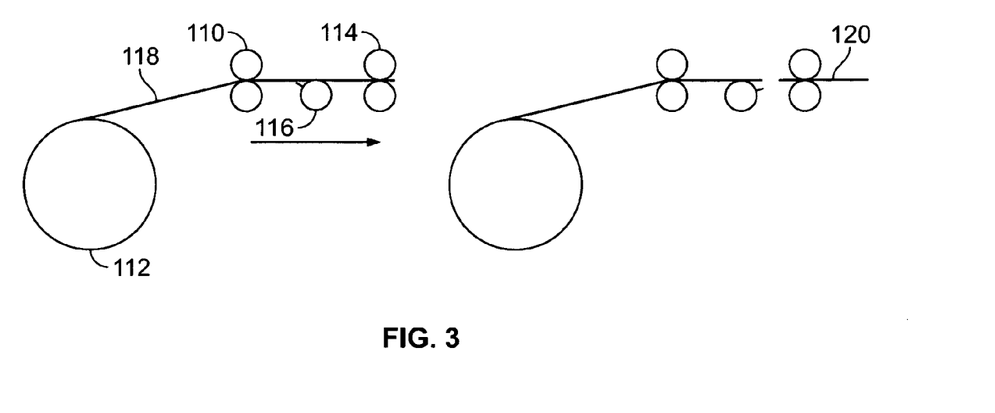
FIG. 3 shows a representative diagram of the paper feeding operation in a prior art machine.

Secondary roller 114 is driven at a higher speed than primary roller 110 in order to provide pulling tension. Secondary roller 114 should have less friction than the primary roller to allow the wrap to slip. Once the sheet is cut, however, the paper stops slipping and is accelerated. It is critical for the operation of the machine that the cut sheet 118 be fed into the wrapping device at the correct time in the machine cycle.

In a typical prior art machine, in use for decades, the primary and secondary rollers 110 and 114 and the rotary knife 116 are coupled together at a fixed rate in a common mechanical drive, which is attached to the main machine drive. The proper machine timing and speed ratios are maintained through the use of timing belts, chains or gearing. In recent years, however, some customers have demanded that sandwich machines be able to run "registered" wrap, which has prompted design changes in the paper feeding mechanism. Registered wrap has a mark printed on it to facilitate a sensor determining the position of the wrap. The wrap may then be cut at the necessary spot to correctly position the wrap printing on the sandwich. Registration is not new to the industry, and is typically accomplished by varying the timing of the web as it passes by the knife.

Typical application of registered wrap will not work on an ice cream sandwich-making machine, however, where the primary and secondary paper rollers and the knife roller are all linked together by a common drive. A sandwich machine requires that the paper be cut and fed into the wrapping section precisely at the correct time. Therefore, in existing prior art designs, the primary roller 110 has been designed to operate independently so that it may correctly position the paper for cutting, while the rotary knife 116 and the secondary roller 114 are mechanically coupled to the machine as before.

Bringing the paper "into registration" requires moving the paper to the correct position at the time the knife contacts the paper. This must be done at start-up as well as continuously during operation to maintain registration. Therefore, the primary roller will need to accelerate or decelerate momentarily during operation as the control system dictates.

Prior art machines which couple the knife and secondary roller to the main filler may suffer in performance when the registration correction is made by the primary roller. At start-up, the primary roller may actually move the paper faster than the secondary roller takes it away. This may cause the paper to accumulate in the drive and jam, or cause the paper to be too slack to be cut.

Figure 4:
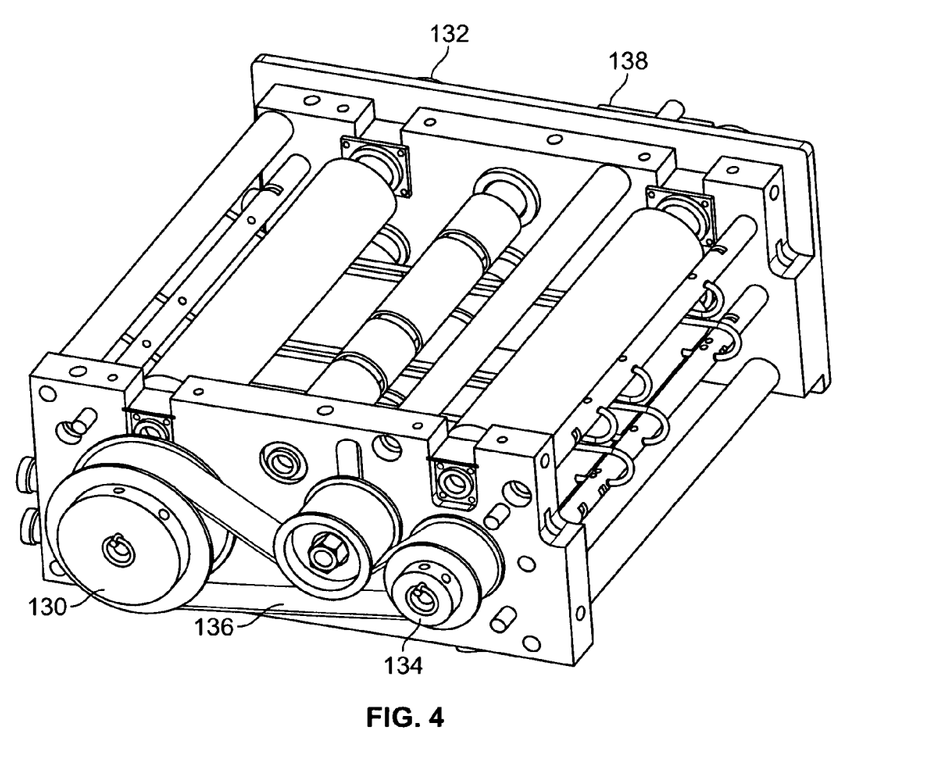
FIG. 4 shows a coupled paper feeder drive system in accordance with the present invention.

This problem has been eliminated in the present invention by providing an improved machine in which the primary and secondary rollers are coupled with a timing belt, as shown in FIG. 4. In FIG. 4, primary roller 130 is driven and is coupled to secondary roller 134 through belt 136. The two rollers act together to control the paper position for cutting, while maintaining constant tension on the paper web and preventing paper jams. Knife drive 138, however, is not connected to roller drive 132 or to primary and secondary rollers 130 and 134, but remains mechanically driven by the main machine drive, thus maintaining proper cut-sheet delivery into the wrapping section of the machine.

A further improvement to the paper roller apparatus relates to improved control over the pressure on the rollers. As discussed above with respect to FIG. 3, secondary roller 114 must rotate faster than primary roller 110 in order to draw paper 118 from primary roller 110 under tension, but it must not cause the paper to slip in primary roller 110, or the length of cut sheet 120 will be incorrect. Therefore primary roller 110 must always grip the paper 118 more tightly than the secondary roller 114. This is accomplished by placing more pressure on the primary rollers than on the secondary rollers. Commonly in the prior art, this is accomplished through the use of mechanical compression springs 140, as shown representatively in FIG. 5.

However, paper feeding problems will occur if the pressures are not correct and even. Too high a pressure will cause cut sheet 120 to wrinkle and not fold properly around the sandwich. Uneven pressure from side-to-side will cause the paper to run off-center so that cut sheet 120 will be improperly placed on the sandwich. Additional complications occur with the use of various wrap materials and coatings (plastic film, metalized plastic, and foil, etc.). Proper setting of the roller pressure is therefore critical to the optimal function of the ice-cream sandwich making machine.

Figure 5:
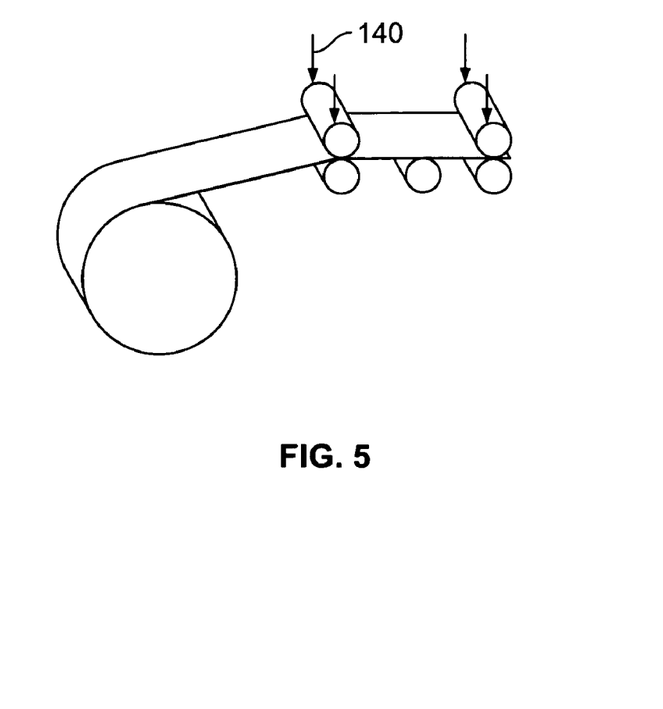
FIG. 5 shows a representative diagram of mechanical spring compressors in accordance with the prior art.

As noted above, the standard design used in prior art machines, as shown in FIG. 5, uses mechanical compression springs 140, typically with some type of threaded adjustment screw to apply pressure on the paper feed rollers. This is a mechanically robust method, but it has shortcomings. The required springs may vary somewhat in their mechanical properties and are difficult to set to the proper spring force, except by "feel" by a skilled mechanic. Varying the pressure to optimize the machine performance is difficult and time-consuming and is difficult or impossible to do while the machine is in production. Improper spring force is often the cause of poor paper-feed operation and machine down-time.

Figure 6:
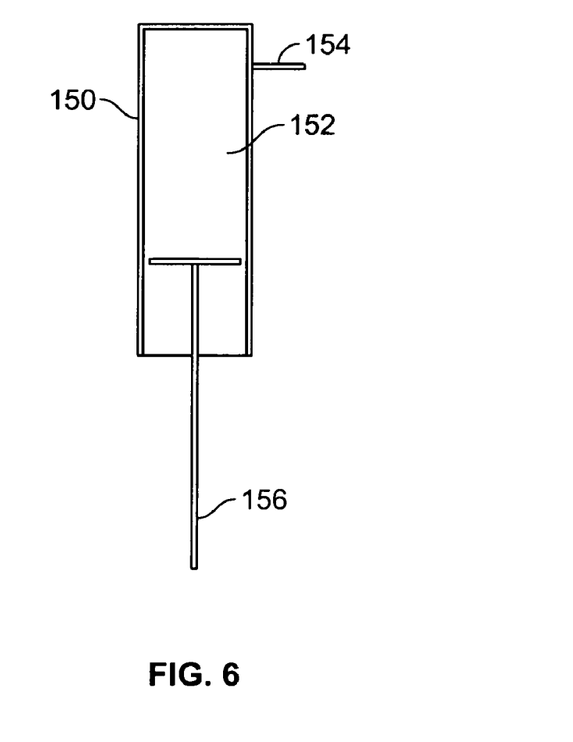
FIG. 6 shows an air cylinder spring suitable for use in the present invention.

The machine of the present invention solves these problems by utilizing air-cylinders as air-springs instead of mechanical compression springs. As shown in FIG. 6, an air cylinder spring 150 comprises a chamber 152 into which pressurized air may be introduced via a line 154. As the air pressure in chamber 152 increases, piston 156 is displaced downward, creating a linear mechanical force proportional to the air-pressure at the cylinder piston rod.

Air-pressure regulators commonly known are used in the present invention to provide a constant pressure that can be easily set to a known value indicated on a pressure gauge. A first pressure would be used for both air-cylinders on the primary roller, and a second, lesser pressure would be used for the secondary roller. The pressures required for the various wrap materials or conditions can easily be set by adjusting the regulators or through an automatic control system utilizing multiple regulators and appropriate valves or with electronically adjustable pressure regulators.

Sensors for Detection of Low Paper

Figure 7:
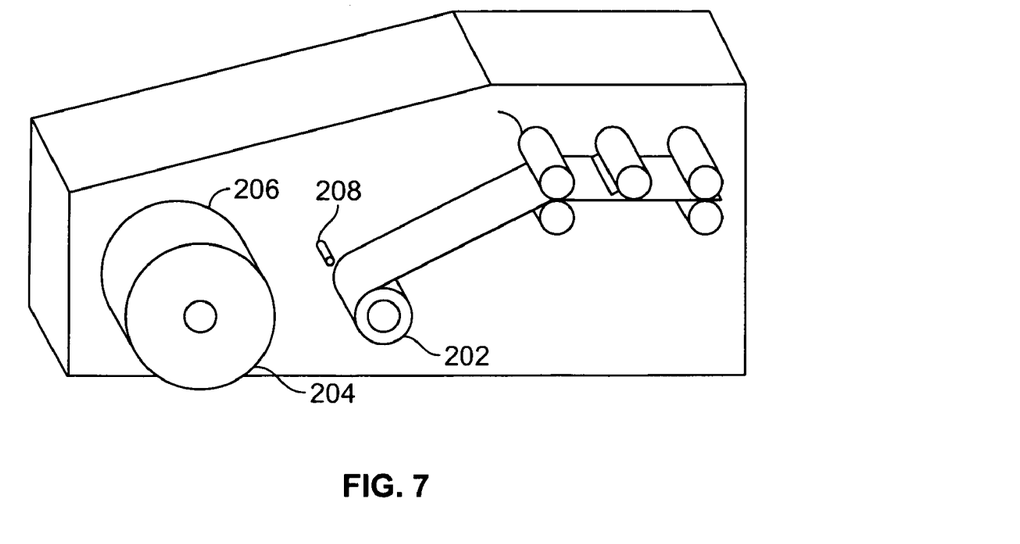
FIG. 7 shows an apparatus for detecting low paper.

Another aspect of the present invention relates to the replacement of the supply roll of wrapping paper. As shown in FIG. 7, sandwich machines are typically supplied with two supply-roll mounts 202 and 204 in order to allow the machine to be run continuously by making on-the-fly splices from one roll to the other as the first roll runs empty. This operation is performed manually by the machine operator. However, the operator must remain alert in order to be prepared to make the splice before the paper runs out completely.

One way to accomplish this task without the need for constant operator attention would be by mounting photo-electric or mechanical switches 206 and 208 near the center of the supply rolls between the vertical face of the machine cabinet and the rolls. When the roll runs nearly empty, the sensors detect the condition and trigger an indication for the machine operator. For example, as shown in FIG. 7, sensor 208 will have been tripped by the fact that roll mount 202 is nearly empty.

There are several problems with this design. The sensors 206 and 208 are exposed to physical abuse while loading the rolls and during cleaning operations. The sensors are also exposed to corrosive chemicals during clean-up. The sensors tend to fail often or can become broken or misaligned.

This problem has been solved in the present invention by utilizing an existing machine component as a roll-near-empty sensor. Paper-feed systems in present machines use some means to provide drag on the paper supply roll. Typically, as shown in FIG. 8, this is accomplished through the use of one or two paddles 210, which apply radial pressure on the paper roll 204 by means of an air cylinder.

Figure 8:
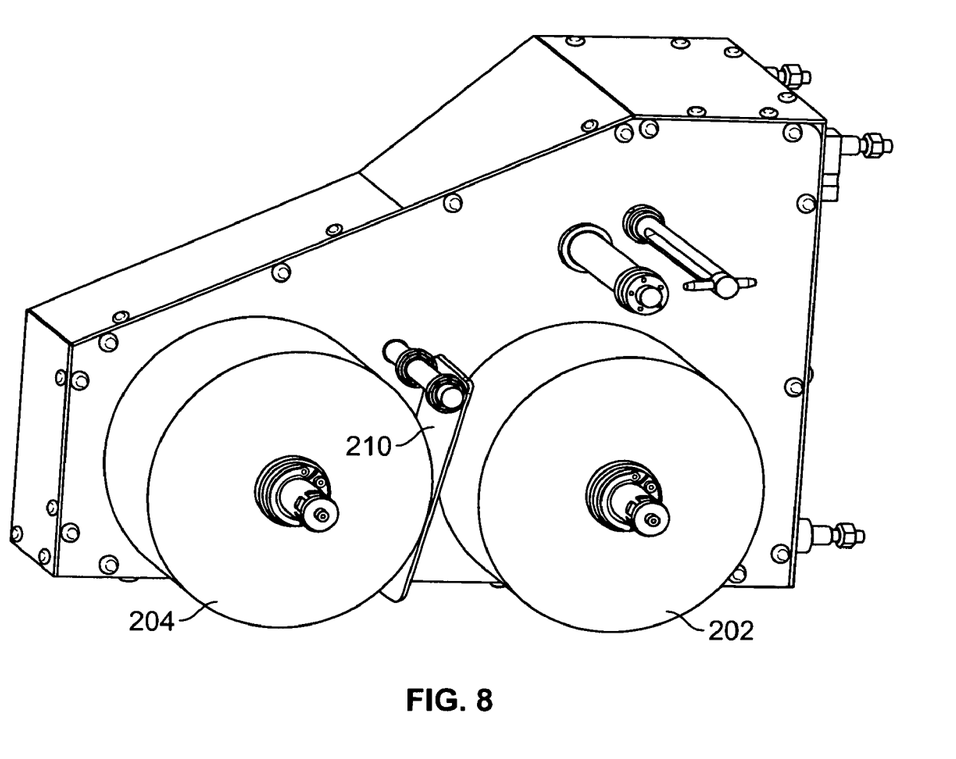
FIG. 8 shows an improved apparatus for detecting low paper in accordance with a preferred embodiment of the present invention.
Figure 9:
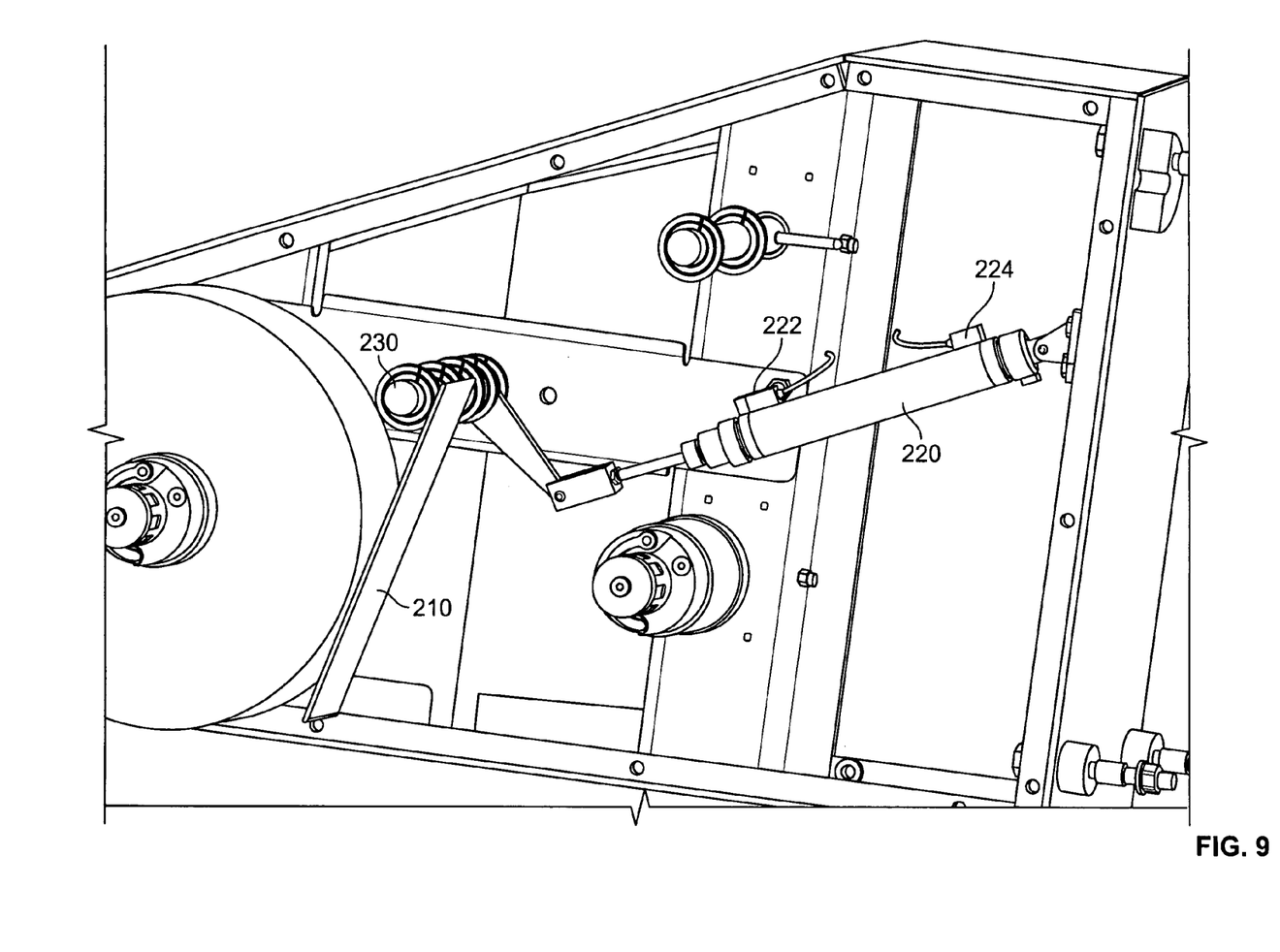
FIG. 9 shows an inner view of the apparatus shown in FIG. 8.

In the present invention, as shown in FIGS. 8 and 9, a single paddle powered by an air-cylinder is used. The paddle 210 pivots about a central member 230 and is biased toward roll 204 by an air-cylinder 220, which is equipped with sensors 222 and 224. As the paper is dispensed from roll 204, air cylinder 220 acts to move paddle 210, and sensors 222 and 224 detect the change in position of the cylinder 220 caused by the change in position of paddle 210. These sensors can be calibrated to indicate when the paper rolls reach a desired state. Sensors 222 and 224 positioned inside the machine frame, such as those shown in FIG. 9, as opposed to outside the frame, will be subject to far less abuse than those mounted near the center of the supply rolls, resulting in a more robust system.

Parking of Wrapping Paper

Another aspect of the present invention comprises a method to "park" the wrapping paper for cleaner operation after stopping the filling machine. A typical prior art sandwich machine has a main drive to operate the machine, and a paper-feed which can be stopped and started independently. The main machine drive must be started, and sandwiches brought to the wrapping area before the wrap is turned on. Running the wrap without sandwiches present is wasteful and may cause the cut sheets of paper to jam in the wrapping mechanism. The paper-feed may be driven from the main drive and stopped and started by use of a clutch mechanism, or utilize a completely independent drive motor, as is known in the prior art.

Sandwich machines capable of running registered wrap must use an independent drive for the paper-feed rollers in order to correct the wrap print location as it is presented to the knife. The knife is driven by the main filler drive and rotates whenever the main drive is on.

When the main drive is on and the paper feed drive is stopped, the knife damages the leading edge of the paper still in the paper-feed rollers. The knife may also cut small pieces of paper which accumulate in the paper-feed area and can cause feeding problems which require a shut-down to clean, or else the product may become contaminated.

The knife could be de-coupled from the main drive with a clutch to prevent damaging the paper web, but this solution has several drawbacks. A sandwich machine is a complex machine that can be difficult to service and maintain. Adding a clutch or independent drive to the knife would be expensive and make the machine more difficult to service or require the machine to be physically larger. Operators prefer as small a machine as possible.

As shown in FIG. 10, the present invention includes a method for preventing damage to the paper web when stopping the paper-feed drive. The machine control system (not shown) monitors the position of the main machine drive (not shown) through methods known in the prior art and times the stop signal to the paper feed so that the last cut sheet will be released to be wrapped at the stopped position. Thus, FIG. 10A shows the system in normal operation, just before the paper is cut. FIG. 10B shows the system just after the paper is cut. These figures are similar to the operation shown in FIG. 3, above.

Figure 10A:
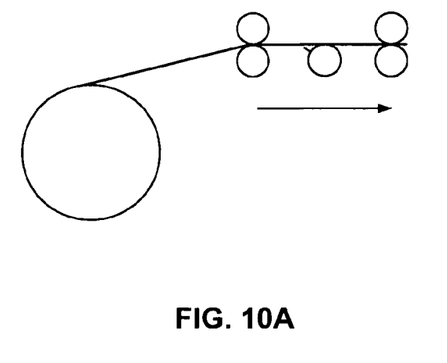
FIGS. 10A, 10B, 10C, 10D show a method for parking wrap paper in accordance with the present invention.
Figure 10B:
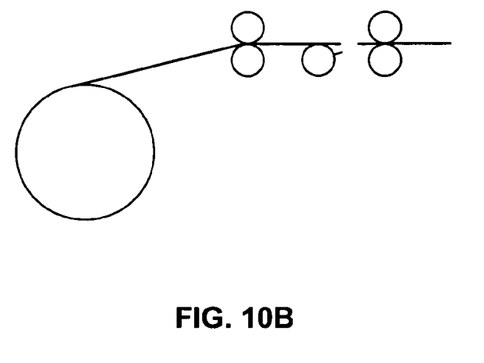
Figure 10C:
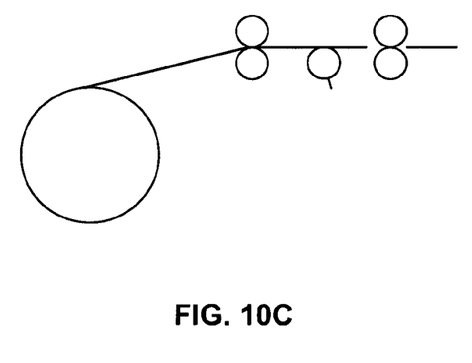
Figure 10D:
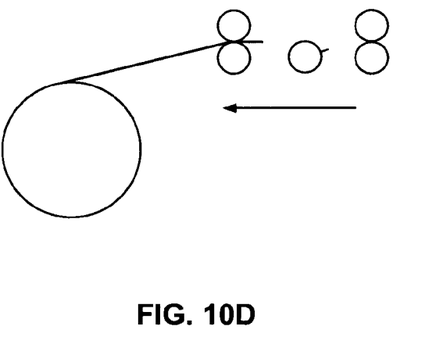

FIG. 10C shows the system in a stop position after the cut sheet has been released from the secondary rollers. The control system can then direct the paper-feed drive to immediately reverse a small amount to "park" the paper out of the way of the rotating knife blade, as shown in FIG. 10D. The adjustments needed to be made to any typical control system used in controlling ice cream sandwich-making machines to accomplish this aspect of the invention would be well understood by one of ordinary skill in the art.

Hinged Exit Tray

Finally, another aspect of the present invention involves the use of a hinged exit tray to allow easier access to the underside of the exit tray and paper feed mechanisms on a sandwich-making machine.

An ice-cream sandwich machine is a highly mechanized and complex device which must be thoroughly cleaned every day. In order to accomplish this, some disassembly is normally required. One of the components normally removed for cleaning is the exit tray. The exit tray is a mechanical assembly that performs several functions. First, it guides and supports the wrapped sandwiches as they exit the filler. The exit tray also comprises the heated platen, which provides heat for the bottom heat seal of the sandwich wrapper. As such, the exit tray is usually bulky and heavy (often between 40 to 50 pounds) and is cumbersome to remove for cleaning. Dairies therefore have the choice of removing the tray for cleaning, exposing personnel to injury and the equipment to damage, or not doing so, and making sanitation more difficult. The tray also must be removed to gain access to the paper feed drive unit located below the tray, either to clear jams or for maintenance and inspection. Prior art tray designs comprise a tray assembly bolted to the filler. To remove the tray, it must be unbolted and the heating units removed.

Figure 11:
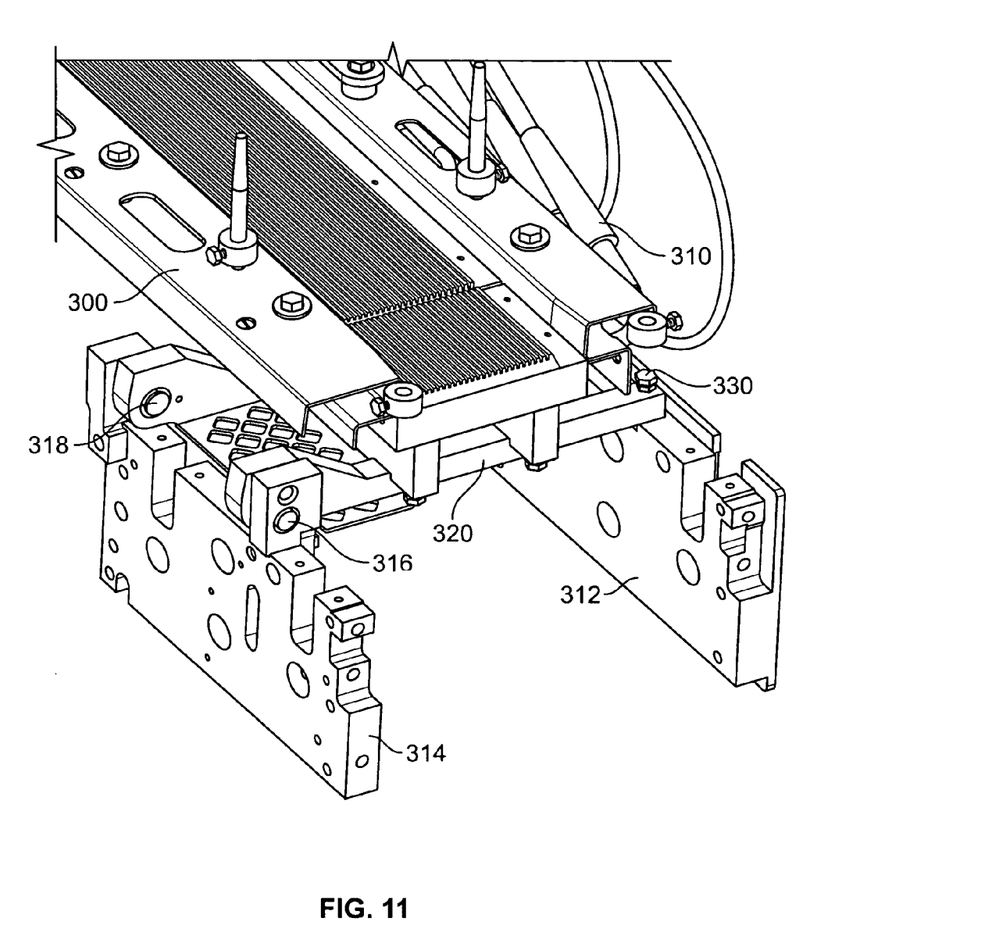
FIGS. 11 and 12 show an improved exit tray assembly in accordance with the present invention.
Figure 12:
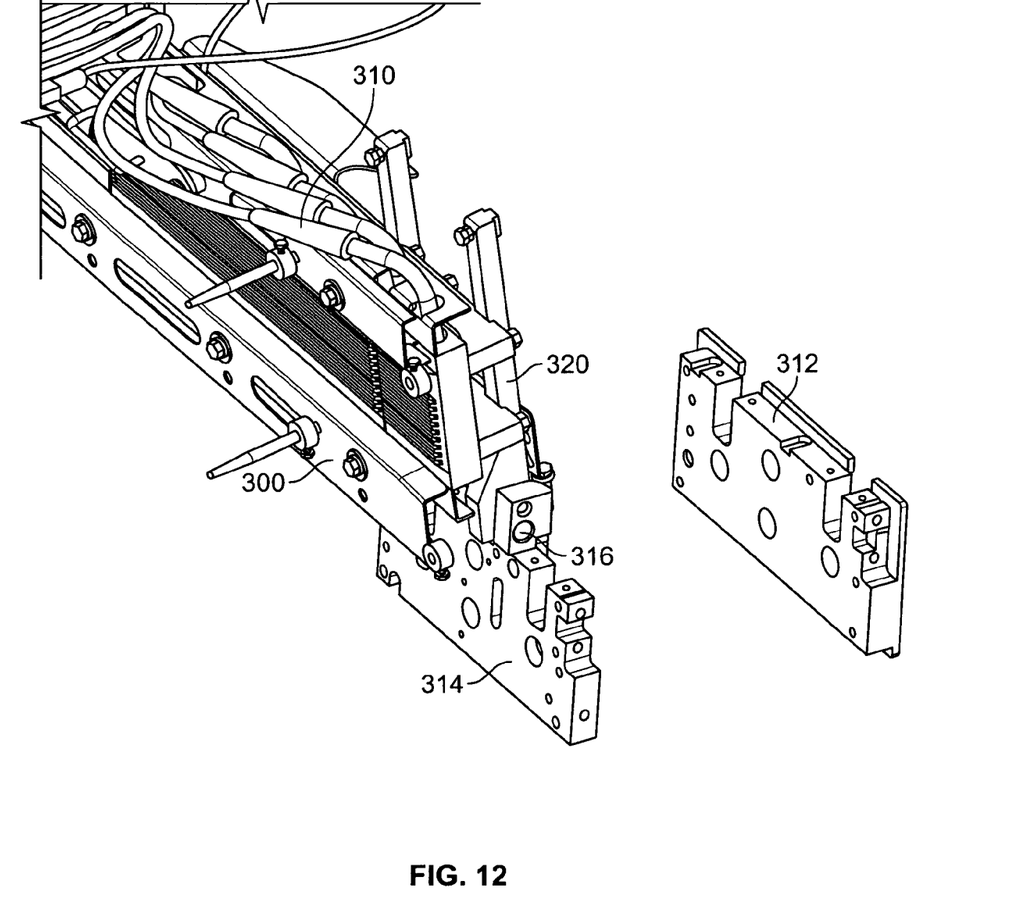

In the improved tray shown in FIG. 11, an exit tray assembly 300, which includes cartridge heaters 310, is mounted rigidly on hinge arms 320, which are pivotably secured to paper feed frame 314 through hinges 316 and 318. The other end of the hinge arms 320 rests on paper feed frame 312. Adjustment screws 330 allow for the leveling of the tray. Thus, as shown in FIG. 12, in order to open the tray, the assembly 300 is rotated through the hinges 316 and 318.

The foregoing descriptions and figures are intended to be exemplary, and various modifications and changes may be made with regard to the foregoing descriptions without departing from the spirit of the invention.

What is claimed is:

1. An improved wrapping assembly for an ice-cream sandwich-making machine comprising:
    an oscillating arm driven by a cam;
    a frame connected to said oscillating arm by one or more rod members and at least one air cylinder;
    a horizontal slider plate affixed to said frame for receiving thereon a sandwich from an elevator;
    a pusher unit connected to said oscillating arm by said rod members through said frame;
    and a stationary stop affixed to a wrapper head;
    wherein as said oscillating arm moves said frame toward said wrapper head, said frame is stopped from further movement by said stationary stop and through compression of said air cylinder, and said pusher unit continues to move, pushing said sandwich off said horizontal slider plate and onto said wrapper head; and
    wherein said frame comprises a rear panel and a forward panel, each including one or more apertures, and said rod members are connected to said panels through a plurality of bushings in said apertures, and at least one of said apertures is slotted to allow for lateral movement of said rod and bushing passing therethrough.

2. An assembly according to claim 1, wherein at least one of said bushings is comprised of bronze.

3. An improved wrapping assembly for an ice-cream sandwich-making machine comprising:
    an oscillating arm driven by a cam;
    a frame connected to said oscillating arm by one or more rod members and at least one air cylinder;
    a horizontal slider plate affixed to said frame for receiving thereon a sandwich from an elevator;
    a pusher unit connected to said oscillating arm by said rod members through said frame;
    and a stationary stop affixed to a wrapper head;
    wherein as said oscillating arm moves said frame toward said wrapper head, said frame is stopped from further movement by said stationary stop and through compression of said air cylinder, and said pusher unit continues to move, pushing said sandwich off said horizontal slider plate and onto said wrapper head, and wherein said assembly further comprises:
    a primary paper roller and a secondary paper roller coupled together to a roller drive, and a knife roller separately coupled to a knife drive, wherein said rollers dispense paper for wrapping said sandwiches; and
    a paddle disposed to pivot about a central member as paper is dispensed from said primary roller, an air cylinder connected to said paddle, and one or more sensors connected to said air cylinder, wherein as said paper is dispensed and said paddle pivots about said central member, said air cylinder changes position, and said sensors detect said change in position.

4. An improved wrapping assembly for an ice-cream sandwich-making machine comprising:
    an oscillating arm driven by a cam;
    a frame connected to said oscillating arm by one or more rod members and at least one air cylinder;
    a horizontal slider plate affixed to said frame for receiving thereon a sandwich from an elevator;
    a pusher unit connected to said oscillating arm by said rod members through said frame;
    and a stationary stop affixed to a wrapper head;
    wherein as said oscillating arm moves said frame toward said wrapper head, said frame is stopped from further movement by said stationary stop and through compression of said air cylinder, and said pusher unit continues to move, pushing said sandwich off said horizontal slider plate and onto said wrapper, and wherein said assembly further comprises:
    an exit tray disposed forward of said wrapper head and situated upon one or more hinge arms, wherein said hinge arms are pivotally connected to a paper feed frame so that said exit tray may be pivoted upward to facilitate access beneath said exit tray.

* * * * *